United States Patent [19]

Rehbein et al.

[11] Patent Number: 4,684,009
[45] Date of Patent: Aug. 4, 1987

[54] TWO-PART SCRAPER FOR CHAIN CONVEYORS

[75] Inventors: Friedhelm Rehbein, Menden-Oesbern; Klaus-Dieter Peitzmeier, Löhne, both of Fed. Rep. of Germany

[73] Assignee: August Thiele, Iserlohn-Kalthof, Fed. Rep. of Germany

[21] Appl. No.: 758,545

[22] Filed: Jul. 24, 1985

[30] Foreign Application Priority Data

Jul. 28, 1984 [DE] Fed. Rep. of Germany ....... 3427917

[51] Int. Cl.[4] ............................................. B65G 19/24
[52] U.S. Cl. .................................................... 198/731
[58] Field of Search ............................... 198/731, 733

[56] References Cited

U.S. PATENT DOCUMENTS 4,505,379 3/1985 Temme ................................ 198/731

FOREIGN PATENT DOCUMENTS

| 79713 | 5/1983 | European Pat. Off. | ............ 198/731 |
| 78438 | 5/1983 | European Pat. Off. | ............ 198/731 |
| 1481350 | 1/1967 | Fed. Rep. of Germany | ...... 198/733 |
| 1964975 | 11/1970 | Fed. Rep. of Germany | . |
| 2031927 | 8/1972 | Fed. Rep. of Germany | . |
| 2807883 | 8/1979 | Fed. Rep. of Germany | . |
| 2905756 | 8/1980 | Fed. Rep. of Germany | . |
| 2943719 | 5/1981 | Fed. Rep. of Germany | . |
| 3150302 | 7/1983 | Fed. Rep. of Germany | . |

Primary Examiner—Joseph E. Valenza
Assistant Examiner—D. Glenn Dayoan
Attorney, Agent, or Firm—Michael J. Striker

[57] ABSTRACT

A two-part scraper for a medium chain conveyor, particularly double chain conveyor includes a lower scraper half secured by bolts to an upper scraper half. Two scraper parts are separated from each other by a separating plane and include between each other a chain bed in which a plurality of parallel channels are provided, receiving horizontal chain links. The lower scraper part is formed with abutment teeth which extend upwardly therefrom between each two adjacent channels. The abutment teeth are engaged in respective abutment recesses formed in the upper scraper half. The curved cross-piece portions of the vertical chain links are in engagement with arch-shaped recesses provided on the backsides of the abutment teeth.

5 Claims, 8 Drawing Figures

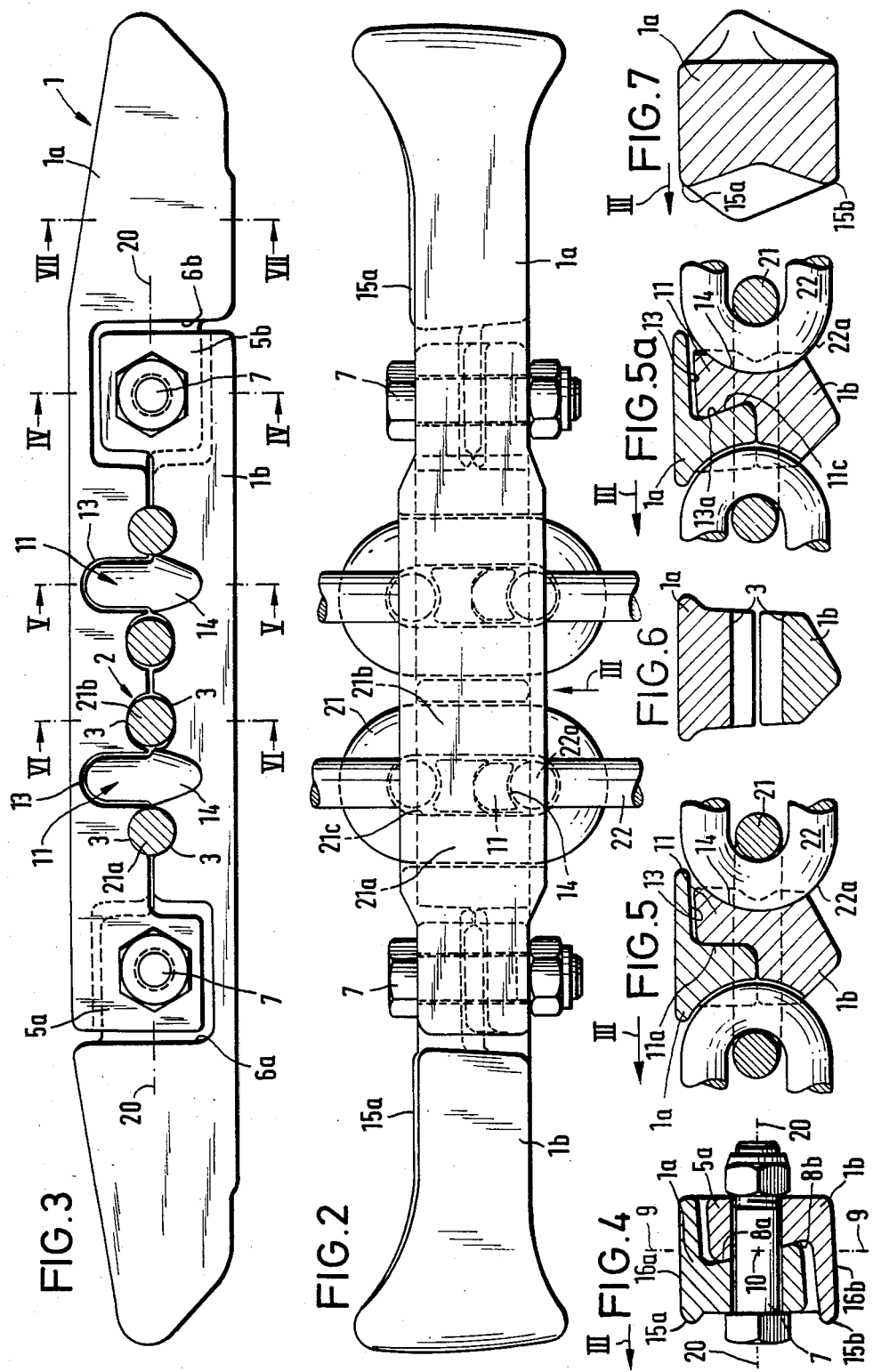

TWO-PART SCRAPER FOR CHAIN CONVEYORS

BACKGROUND OF THE INVENTION

The present invention pertains to a two-part scraper for a medium-type chain conveyor.

A two-part scraper for a chain conveyor of the type under discussion is normally comprised of a lower scraper part and an upper scraper part which in assembly form a plurality of channels receiving chain links. In two-part scrapers of this type the lower scraper half is usually downwardly tapered to be easily engaged in respective recesses provided on the chain drums of the chain conveyor. The tapering in the cross-section of the lower scraper portion has caused, however, weakening of this cross-section in the region of the chain bed so that the latter as well as the upper scraper half have been subjected to continual attacks of the vertical chain links, acting in the feeding direction; these attacks have caused bending of the horizontal chain links clamped between two scraper halves.

When the function abilities of the scraper are not affected both scraper halves should be formed so that forces exerted on the scraper by the conveyor chains would be taken up by the scraper as uniformly as possible.

SUMMARY OF THE INVENTION

It is an object of the present invention to provide an improved two-part scraper for a chain conveyor.

It is another object of the invention to provide a two-part scraper in which forces exerted on the back side of the scraper by the rear vertical links of the conveyor chain or conveyor chains would be taken up by both scraper halves as uniformly as possible without requiring an additional clamping of two halves to each other in the direction transversal to the feeding direction of the conveyor chain.

These and other objects of the invention are attained by a two-part scraper for a chain conveyor, particularly a double chain conveyor, comprising an upper scraper half and a lower scraper half separated from each other by a separating plane and forming therebetween a chain bed extending through said plane, said upper and lower half forming with each other in said chain bed a plurality of parallel channels positioned one after the other and separated from each other by webs, said channels each receiving a portion of a respective horizontal chain link of a chain, said upper and lower half being connected to each other by connecting bolts positioned at two sides of said chain bed, each web, formed on one of said halves between two adjacent channels receiving two portions of the horizontal chain link, being provided with an abutment tooth extended outwardly of said one half, whereas the other of said halves is provided with abutment recesses each engaging a respective abutment tooth in a form-locking fashion, each horizontal chain link having an opening through which said abutment tooth extends, each abutment tooth having a backside formed with a circular arch-shaped recess which receives a curved stem of a respective vertical chain link of the chain, said vertical chain link being tracked with said horizontal chain link.

Each abutment tooth may have a vertical end face extended traversely to a feeding direction of the chain.

In a modified construction each abutment tooth may have an end face which is inclined forwardly in a feeding direction of the chain while each abutment recess in the other of said halves has a forwardly inclined surface immediately abutting against said inclined end face.

The arch-shaped recess on said backside of each tooth may extend uniformly at two sides of said separating plane.

Each abutment tooth and each abutment recess may have rounded-off engagement edges.

The upper scraper half and the lower scraper half may each have an edge projection extended outwardly in a feeding direction of the chain and each has an enlarged wear-resistant surface.

Each said edge projection may extend over the entire length of the respective scraper half.

The chief advantage of the scraper of the present invention resides in that the scraper is additionally symmetrically divided in the plane which is substantially vertical and transversal to the feeding direction or inclined to the feeding direction. Thereby each vertical chain link engaged on the backside of the scraper does not differently affect each of the two halves of the scraper. Furthermore, each vertical chain link is engaged in a form-locking fashion in the above mentioned arch-shaped recess provided on the backside of each abutment tooth formed on the lower scraper half. Each recess for receiving the vertical chain link extends at the backside of the lower scraper half from below the longitudinal axis of symmetry upwardly and reaches up to the upper end of the abutment tooth protruding upwardly from the lower scraper half. Pressure forces exerted on the abutment tooth by the vertical chain link are transmitted to the upper scraper half. Each abutment tooth can thereby have a vertical end face which extends traversely to the feeding direction. It is also advantageous for an additional locking of both scraper halves to each other if the end face of each abutment tooth would be inclined forwardly and received in the respective recess with the inclined abutment wall.

In the both above described situations a specifically favorable taking up of chain pulling forces acting on the chain would be ensured when the above-mentioned arch-shaped recess on the backside of the abutment tooth extends somewhat uniformly at both sides of the chain longitudinal axis of symmetry or the separating plane between two scraper halves.

Enlarged wear-resistant surfaces at the upper and lower edges of the scraper as well as the edge projections protruding outwardly in the feeding direction significantly reinforce the scraper. This structure results in enlargement of the cross-section at which high pressing and bending forces act; therefore resistance to wear and life-span of the scraper are substantially increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 2 is a top plan view of the scraper in the assembled condition;

FIG. 3 is a back view of the scraper, seen in the direction of feeding III of FIG. 1;

FIG. 4 is a sectional view taken along line IV—IV of FIG. 3;

FIG. 5 is a sectional view taken on line V—V of FIG. 3;

FIG. 5a is sectional view similar to that of FIG. 5 but of a modified embodiment of the scraper;

FIG. 6 is a sectional view taken along line VI—VI of FIG. 3; and

FIG. 7 is a sectional view taken along line VII—VII of FIG. 3.

DETAILED DESCRIPTION OF THE PREFERRED EMBODIMENTS

Figure 1:
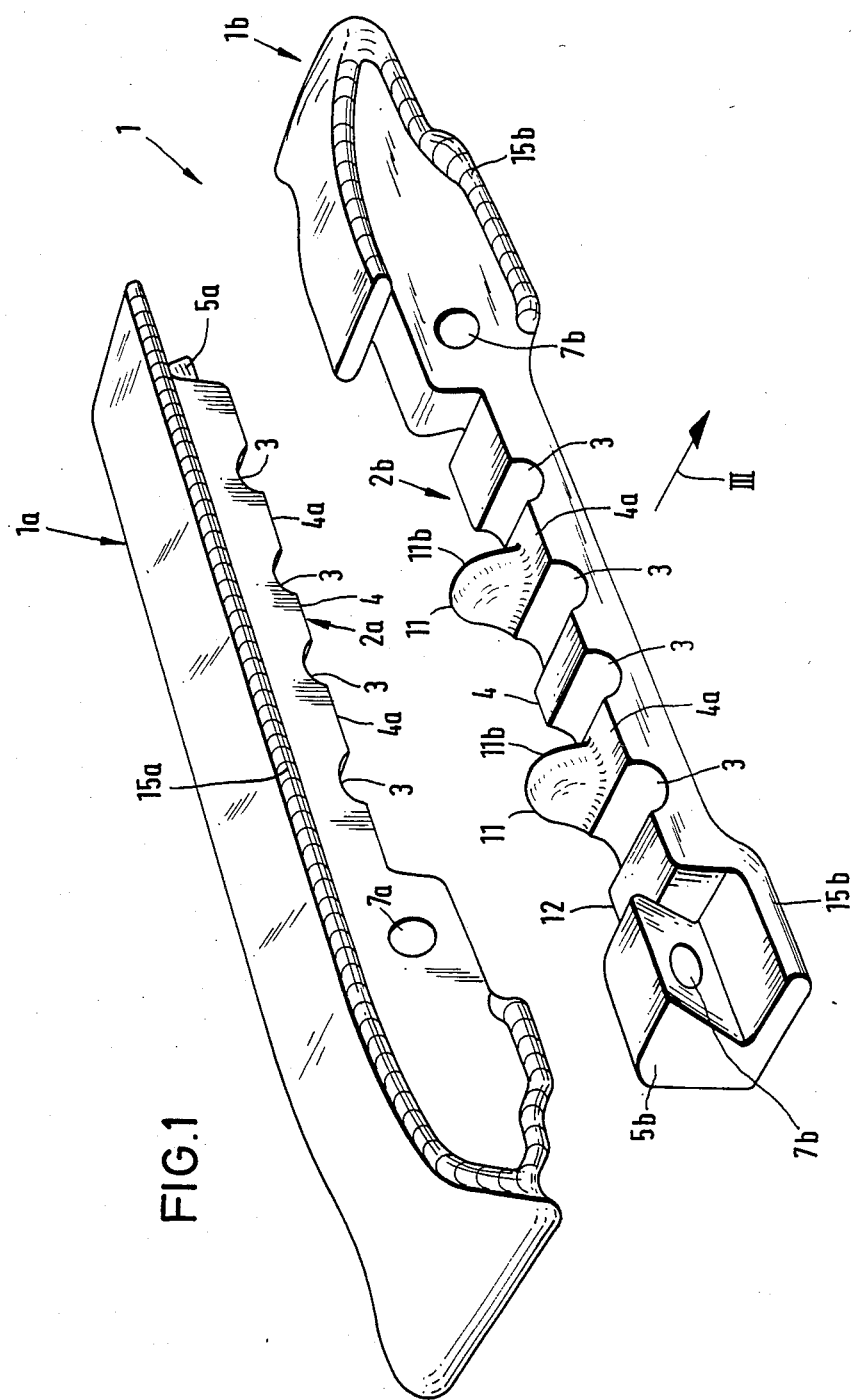
FIG. 1 is a front perspective view of two parts of the scraper according to the invention.

As shown in FIGS. 1 through 3 a two-part scraper 1 for a middle double chain conveyor is formed of an upper scraper half 1a and a lower scraper half 1b. The two-part scraper 1 has a chain bed 2 (FIG. 3) which extends through a separation plane 20 which separates the upper scraper half from the lower scraper half. The so-formed chain bed or case halves 2a and 2b (FIG. 1) have parallel and positioned immediately-one-after-another channels or passages 3 which are separated from each other by webs or cross-pieces 4 and which receive portions 21a, 21b of horizontal chain links 21 of respective conveyor chains.

As can be further seen from the drawings each scraper half 1a, 1b has at two sides of the chain bed 2 toothed projections 5a and 5b which project vertically toward the other scraper half. Each toothed projection 5a, 5b is engaged in a vertically extending recess 5a, 5b of the other scraper half. Both scraper halves 1a, 1b also have in the regions of toothed projections 5a, 5b and respective recesses 6a, 6b bores 7a, 7b (FIG. 1) which are in alignment with each other. Bores 7a, 7b serve the purpose of receiving connecting bolts 7 which in the assembled position extend in the feeding direction III, whereby at least one of the bores 7a, 7b is elongated to make possible a displacement of both scraper halves 1a and 1b relative to each other when the scraper is clamped to the conveyor chains.

As seen from FIG. 4 abutment surfaces 8a, 8b are provided on the toothed projections 5a, 5b and recesses 6a, 6b of the both scraper halves 1a, 1b, which surfaces extend along a common axis 10 which in turn crosses the separation plane 20 whereby surfaces 8a, 8b are oblique or inclined relative to a common vertical longitudinal plane 9 in the pulling or feeding direction III so that the scraper portions can be closely brought one on the other by a relative displacement thereof along the oblique abutment surfaces 8a, 8b and channels 3 for portions 21a, 21b of the the horizontal chain links 21, whereby the chain links 21 can be more or less fixedly clamped in channels 3 between the two scraper halves.

As seen from FIG. 1, a number of abutment teeth 11 are formed between the channels 3 on the lower scraper half 1b. Each abutment tooth 11 projects from the respective web 4a and is formed behind the scraper edge 12. Each abutment tooth 11 is engaged in a respective abutment recess 13 of the opposing scraper half in a form-locking fashion as seen from FIG. 3. Each abutment tooth penetrates a link opening 21c of the horizontal chain link 21 clamped between two scraper halves 1a and 1b and has at its back side a concave recess 14, seen from FIGS. 3 and 5, which recess receives a curved stem or portion 22a of the respective vertical chain link 22 lying on the horizontal chain link 21. The circular arch-shaped vertical recess 14 for receiving the stem 22a of the vertical chain link extends at the back side of each abutment tooth 11 somewhat uniformly at the both sides of the longitudinal axis of symmetry of the chain or at both sides of the separation plane 20 of two scraper halves 2a and 2b so that forces exerted on the scraper by the vertical chain link 22 would not only uniformly act on both scraper halves 1a, 1b but also would be transmitted in a predetermined fashion from the abutment tooth 11, extended upwardly from the lower scraper half 1b, to the upper scraper half 1a and would be therefore taken up by both scraper halves without overloading the latter.

The abutment teeth 11 and the assigned recesses 13 can have rounded-off engagement edges 11b (FIGS. 1 and 5) and also vertical end faces 11a extended normally to the feeding direction III (FIG. 5).

In the modified embodiment shown in FIG. 5a each abutment tooth 11 can have an end face 11c which is forwardly inclined in the feeding direction, end face 11c closely abutting against the forwardly inclined abutment surface 13a of the respective recess 13 of the opposing scraper half 1a.

Furthermore, the scraper halves 1a and 1b can be provided with edge projections 15a, 15b which extend in the feeding direction III and with enlarged upper and lower wear-resistant surfaces 16a, 16b which extend over the middle web area in the feeding direction, of which particularly the scraper edge projection 15a and the enlarged upper wear-resistant surface or flat 16a provide an additional reinforcement of the upper scraper half 1a in the direction of chain pulling so that forces acting on the scraper in the direction of pulling of the chain can be taken up by the scraper without deformations. Edge projection 15a or enlarged wear surface 16a are formed over the entire length of the upper scraper half 1a.

It will be understood that each of the elements described above, or two or more together, may also find a useful application in other types of two-part scrapers for chain conveyors differing from the types described above.

While the invention has been illustrated and described as embodied in a two-part scraper for a chain conveyor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A two-part scraper for a chain conveyor, particularly a double chain conveyor, comprising an upper scraper half and a lower scraper half separated from each other by a separating plane and forming therebetween a chain bed extending through said plane, said upper and lower half forming with each other in said chain bed a plurality of pair of parallel channels positioned one beside the other and said channels in each pair are separated from each other by webs, said channels each receiving a portion of a respective horizontal chain link of a chain, said upper and lower half being connected to each other by connecting bolts positioned at two sides of said chain bed, at least some of said webs, formed on one of said halves between two adjacent channels receiving two portions of the horizontal chain link, being provided with an abutment tooth extended outwardly of said one half, whereas the other of said halves is provided with abutment recesses each engaging a respective abutment tooth in a form-locking fashion, each horizontal chain link having an opening through which said abutment tooth extends, each abutment tooth having a backside formed with a circular arch-shaped recess which receives a curved stem of a respective vertical chain link of the chain, said vertical chain link being tracked with said horizontal chain link, each abutment tooth further having an end face which is inclined forwardly in a feeding direction of the chain while each abutment recess in the other of said halves has a forwardly inclined surface immediately abutting against said inclined end face, each abutment tooth and each abutment recess having rounded-off engagement edges.

2. The scraper as defined in claim 1, wherein each abutment tooth has vertical end face extended traversely to a feeding direction of the chain.

3. The scraper as defined in claim 1, wherein said arch-shaped recess extends at said backside of said abutment tooth uniformly at two sides of said separating plane.

4. The scraper as defined in claim 1, wherein said upper scraper half and said lower scraper half each has an edge projection extended outwardly in a feeding direction of the chain and each has an enlarged wear-resistant surface.

5. The scraper as defined in claim 4, wherein each said edge projection extends over the entire length of the respective scraper half.

* * * * *